United States Patent
Emura et al.

(10) Patent No.: US 9,589,469 B2
(45) Date of Patent: Mar. 7, 2017

(54) DISPLAY CONTROL METHOD, DISPLAY CONTROL APPARATUS, AND DISPLAY APPARATUS

(71) Applicant: Panasonic Intellectual Property Management Co., Ltd., Osaka (JP)

(72) Inventors: Koichi Emura, Kanagawa (JP); Makoto Mochizuki, Kanagawa (JP); Koji Arata, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 75 days.

(21) Appl. No.: 14/623,104

(22) Filed: Feb. 16, 2015

(65) Prior Publication Data

US 2015/0243171 A1 Aug. 27, 2015

(30) Foreign Application Priority Data

Feb. 25, 2014 (JP) .................. 2014-033945
Oct. 7, 2014 (JP) .................. 2014-206445

(51) Int. Cl.
  *B60Q 1/00* (2006.01)
  *G08G 1/16* (2006.01)
  (Continued)

(52) U.S. Cl.
  CPC ............ *G08G 1/166* (2013.01); *G02B 27/01* (2013.01); *G06K 9/00805* (2013.01); *G06T 11/60* (2013.01); *G08G 1/165* (2013.01)

(58) Field of Classification Search
  CPC .... G08G 1/166; G08G 1/165; G06K 9/00805; G02B 27/01; G06T 11/60
  (Continued)

(56) References Cited

U.S. PATENT DOCUMENTS

2010/0253594 A1 10/2010 Szczerba et al.
2011/0228980 A1* 9/2011 Ichikawa ............... H04N 7/181
  382/103
(Continued)

FOREIGN PATENT DOCUMENTS

JP 2011-240843 12/2011

OTHER PUBLICATIONS

The Extended European Search Report from the European Patent Office (EPO) dated Jul. 16, 2015 for the related European Patent Application No. 15154404.6.
(Continued)

*Primary Examiner* — Anh V La
(74) *Attorney, Agent, or Firm* — Greenblum & Bernstein, P.L.C.

(57) ABSTRACT

A computer performs a process to determine whether an object is a predetermined object and a process to control a display unit to generate a first image based on a result of recognized object at a first timing and generate a second image based on a result of the recognized object at a second timing that is later than the first timing if the predetermined object is determined. The first image is an image formed by a pattern of markers representing a skeleton of the object, and the second image is an image formed by a pattern of markers corresponding to the pattern of markers in the first image, and the position of at least one marker of the pattern of markers in the first image differs from the position of the corresponding marker in the second image.

18 Claims, 12 Drawing Sheets

(51) Int. Cl.
  *G02B 27/01* (2006.01)
  *G06T 11/60* (2006.01)
  *G06K 9/00* (2006.01)

(58) Field of Classification Search
  USPC ..... 340/435, 436, 425.5, 457, 904; 348/148, 348/143
  See application file for complete search history.

(56) References Cited

U.S. PATENT DOCUMENTS

| | | | | |
|---|---|---|---|---|
| 2012/0026012 A1* | 2/2012 | Yamashita | ................ | B60R 1/00 340/904 |
| 2012/0050138 A1* | 3/2012 | Sato | ....................... | B60K 35/00 345/4 |
| 2013/0144490 A1 | 6/2013 | Lord et al. | | |
| 2013/0235200 A1 | 9/2013 | Giesler et al. | | |
| 2013/0342913 A1 | 12/2013 | Tsimhoni et al. | | |
| 2014/0085466 A1* | 3/2014 | Moriyama | ............... | G08G 1/165 348/148 |

OTHER PUBLICATIONS

XP055199807, Integrate: "Kinect BVH Motion Capture", Nov. 28, 2013, Retrieved from the Internet: URL:https://web.archive.org/web/20131128045027/http://tech.integrate.biz/kinect_mocap.htm [retrieved on Jul. 2, 2015].

XP055199804, Patrick Godwin: "Intro to the Kinect SDK-Drawing Joints in XNA Patrick Godwin's Blog-O-Rama!", Jun. 19, 2011, Retrieved from the Internet: http://ximplosionx.com/blog/intro-to-the-kinect-sdkdrawing-joints-in-xna/ [retrieved on Jul. 2, 2015].

Louise L. Sloan "The photopic acuity-luminance function with special reference to parafoveal vision" Pergamon Press1968, vol. 8, pp. 901-911.

Mortimer Mishkin et al., "Contribution of striate inputs to the visuospatial functions of parieto-preoccipital cortex in monkeys" Elsevier Biomedical Press, 1982, pp. 57-77.

Vision Society of Japan, Handbook of visual information processing, pp. 237, 2000.

* cited by examiner

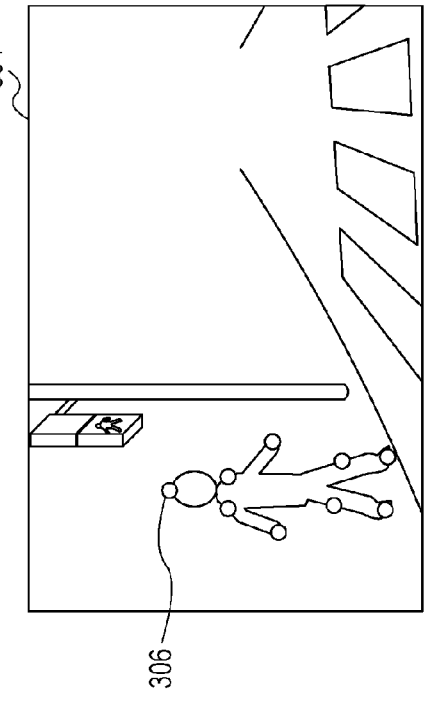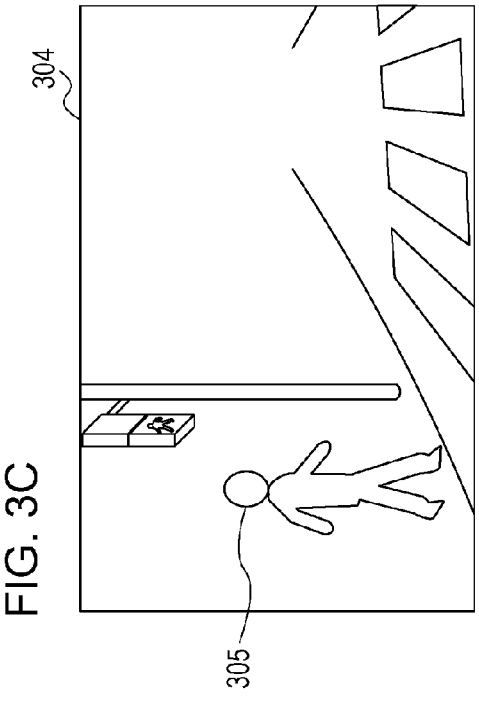
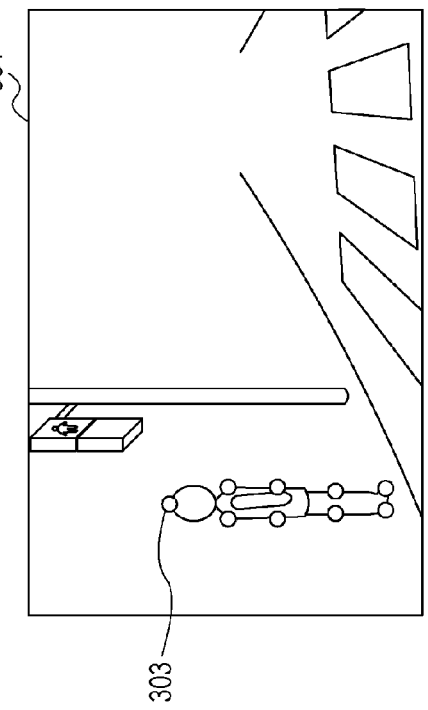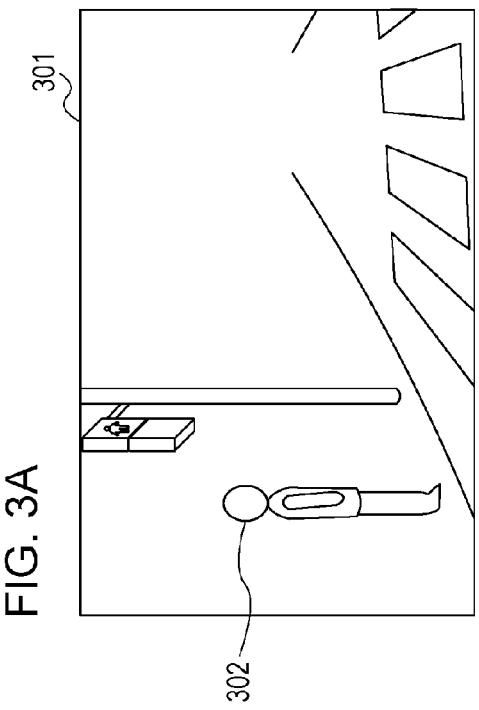

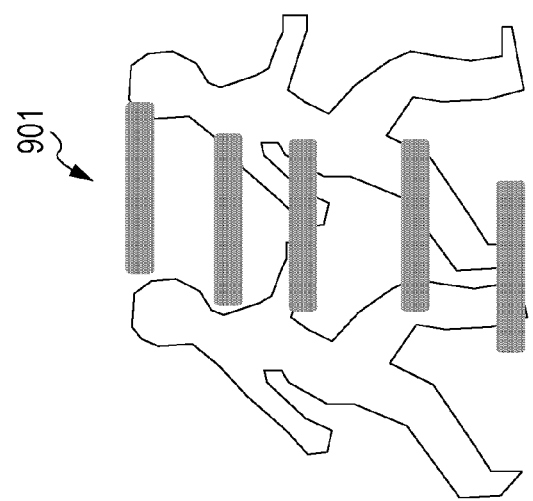
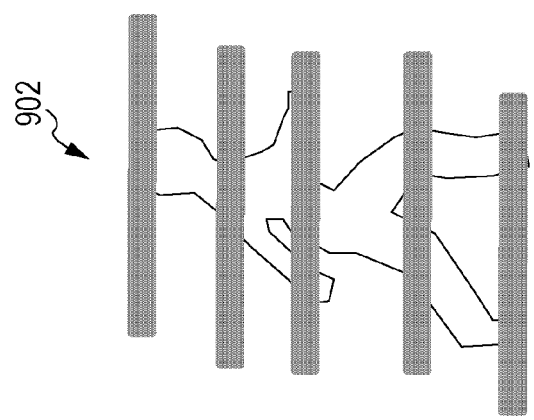
FIG. 12

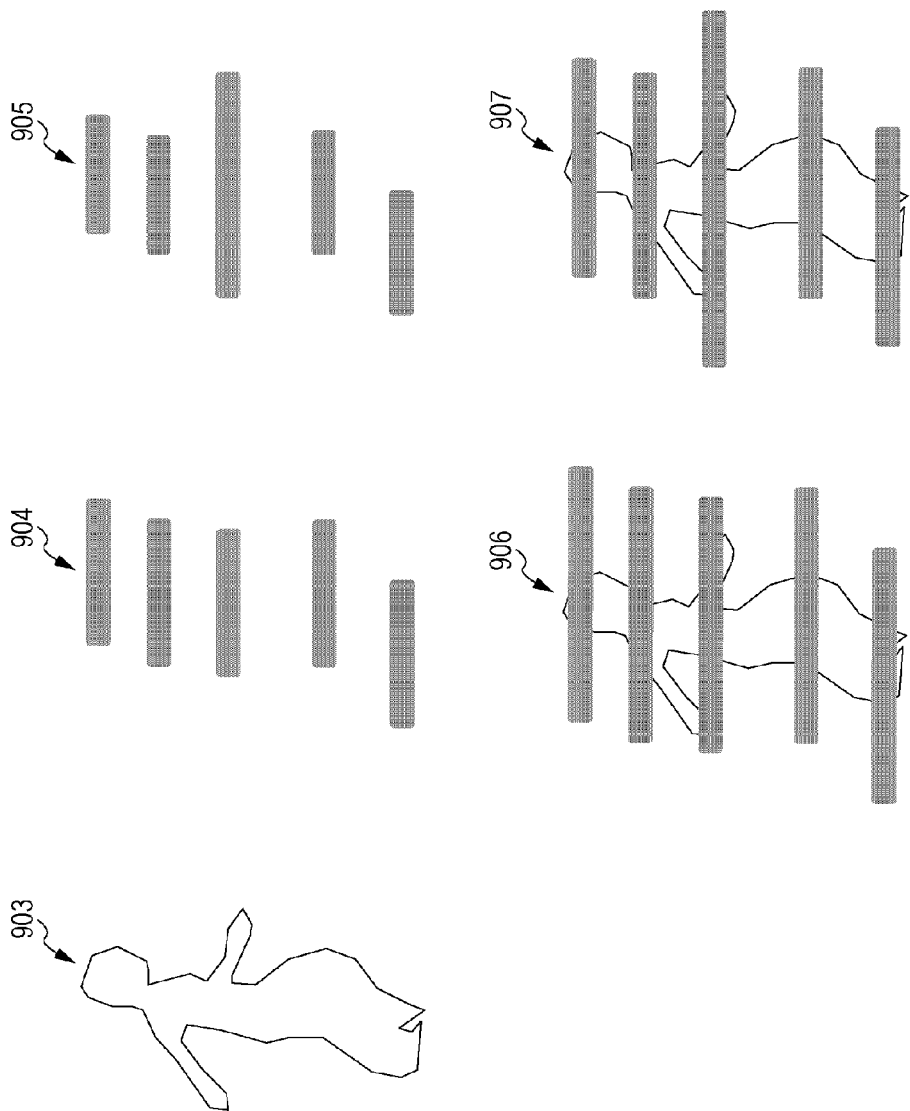

DISPLAY CONTROL METHOD, DISPLAY CONTROL APPARATUS, AND DISPLAY APPARATUS

BACKGROUND

1. Technical Field

The present disclosure relates to a display control method, a display control apparatus, and a display apparatus that control display of information for alerting a driver for safe driving.

2. Description of the Related Art

Nowadays, an advanced driver assistance system (ADAS) that alerts a driver for safe driving is in increasingly widespread use. Examples of the features of ADAS application include lane departure warning (LDW), forward collision warning (FCW), and pedestrian collision warning (PCW). ADAS detects, for example, driving conditions, such as traffic lanes, other vehicles ahead and behind the vehicle, and a pedestrian present in front of the vehicle, using, for example, a vehicle-mounted camera or a radar system. Thereafter ADAS displays information based on the results of detection. The information is displayed on, for example, a meter display, a head-up display (HUD), a head-mounted display or a helmet-mounted display (HMD), or smart glasses.

The human visual field is divided into a foveal vision and a peripheral vision. In terms of the visual resolution, foveal vision constitutes about 2 degrees of our visual field (a range within a radius of about one degree from the center of the fovea) (refer to, for example, L. L. Sloan, "The photopic acuity-luminance function with special reference to parafoveal vision", Vision Research, 1968, pp. 901-911). In terms of the retina structure, foveal vision constitutes 5 degrees of our visual field (refer to, for example, "The Vision Society of Japan Handbook of visual information processing", Asakura Publishing Co., Ltd., 2001, pp. 237). In contrast, according to the neuroanatomy of the visual cortex, foveal vision constitutes 7 degrees of our visual field (refer to, for example, M. Mishkin, L. Ungerleider, "Contribution of striate inputs to the visuospatial functions of parieto-preoccipital cortex in monkeys", Behav Brain Res, 1982, pp. 57-77). The foveal vision is created by a large number of cone cells and provides us with our sharpest vision, or highest acuity of vision and color discrimination ability and, thus, clear vision. In contrast, peripheral vision is created by a few cone cells and provides us with poor color perception. In addition, the visual acuity of the peripheral vision is lower than that of the foveal vision. However, the peripheral vision is created by rod cells that are of high density, and the peripheral vision is significantly sensitive to motion stimuli. The peripheral vision plays an important role in recognizing a spatial position relationship or perceiving a moving object. That is, the human eye has an ability to detect a moving object in the peripheral vision and perceive the details of the object in the foveal vision.

The difference between the visual characteristics in the two visions of the human eye may sometimes cause a traffic accident. For example, since the driver of a vehicle that is moving on a straight road pays attention to the road in front of the vehicle or a vehicle ahead, it is difficult for the driver to find a pedestrian who suddenly steps into the path of the vehicle. This is because the moving speed of the pedestrian is low and the moving distance of the pedestrian is short as compared with the driving environment including the vehicle or the road ahead to which the driver pays attention and, at this situation, the driver needs to find the pedestrian stepping into the path of the vehicle in the peripheral vision. As a result, the driver fails to find the pedestrian with a small movement in the peripheral vision although it is sensitive to the movement. Furthermore, even at an intersection with good visibility in the daytime, a driver may not find a vehicle approaching toward the driver and, thus, crossing collision sometimes occurs. If in the field of vision of a driver, the positional relationship between the driver and another vehicle entering the intersection (the viewing angle from the driver to the another vehicle) does not vary and particularly if the driver only looks straight ahead without turning their eyes to the right or the left, the driver fails to see the oncoming vehicle in time. Thus, the risk of collision increases. This is because since the other vehicle does not move in the driver's vision, the driver cannot find the other vehicle that does not move in the peripheral vision sensitive to a movement and, thus, cannot recognize that the other vehicle is approaching the driver.

As an existing technology for a driver to obtain a large amount of information without turning their eyes to an object present in the peripheral vision, a display apparatus for a vehicle that displays animation that changes in accordance with the information has been developed (refer to, for example, Japanese Unexamined Patent Application Publication No. 2011-240843).

SUMMARY

According to the technology described in Japanese Unexamined Patent Application Publication No. 2011-240843, the driver can recognize the value, the direction, and the positional relationship of the object that the driver needs to watch out for by viewing an animation. However, in each of the cases, the type of object has already been identified, and only the more detailed information can be obtained. That is, the type of object cannot be recognized (e.g., it is difficult to determine whether the object is a pedestrian).

One non-limiting and exemplary embodiment provides a display control method, a display control apparatus, and a display apparatus that allows a driver to recognize the type of an object without turning the driver's eyes to the object present in the peripheral vision.

In one general aspect, the techniques disclosed here feature a display control method for use in a display system including a recognition unit and a display unit, where the recognition unit acquires an image of a front direction of a movable body (i.e, vehicle) and recognizes an object contained in the image of the front direction, and the display unit generates an image based on a result of recognition obtained by the recognition unit and displays the generated image on a display medium. The method includes determining whether the object is a predetermined object and controlling the display unit to generate a first image on the basis of a result of recognition of the object obtained at a first timing and generate a second image on the basis of a result of recognition of the object obtained at a second timing if it is determined that the object is the predetermined object. The first image is an image formed by a pattern of markers representing a skeleton of the object, and the second image is an image formed by a pattern of markers corresponding to the pattern of markers that form the first image. The position of at least one of the markers of the pattern of markers in the first image differs from the position of a corresponding marker in the second image.

These general and specific aspects may be implemented using a system, a method, and a computer program, and any combination of systems, methods, and computer programs.

According to the present disclosure, the driver can identify the type of object without turning their eyes to an object present in their peripheral vision.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIGS. 3A to 3D illustrate an example of the view of a driver and an image presented to the driver according to the first exemplary embodiment of the present disclosure;

FIG. 12 illustrates an example of display from the viewpoint of a driver according to the second exemplary embodiment of the present disclosure; and FIG. 13 illustrates displayed markers according to the second exemplary embodiment of the present disclosure.

DETAILED DESCRIPTION

First Exemplary Embodiment

A first exemplary embodiment of the present disclosure is described below with reference to the accompanying drawings.

According to the first exemplary embodiment of the present disclosure, information is presented to a driver using a biological motion. The biological motion is described below first.

The visual system of a person can retrieve, immediately after another person having light spots set at the locations of his/her joints (e.g., the head, shoulder, elbow, wrist, knee, and ankle) of the skeleton of the body starts a motion, a variety of types of information (e.g., information indicating that the moving object is a human being, the gender, the emotion, the moving direction, and the category of the motion, such as "walking" or "running") (refer to, for example, Hirai, "Developmental neuro-cognitive research on body and body motion perception and foresight", Baby Science Vol. 10, 2010). Such a perceptual phenomenon is referred to as a "biological motion". If at least seven light spots are set, a human being can be recognized (refer to, for example, Johansson, "Visual Perception of biological motion and a model for its analysis", Perception & Psychophysics, 1973, pp. 201-211. In addition, the brain wave activity of a human being starts in only 200 milliseconds after a person sees a biological motion, and high-speed processing is performed (refer to, for example, Hirai, "Study of Our Brain Mechanism Sensitive to Others" Institute for Developmental Research, Rookie's Report, Feb. 6, 2013).

According to the present exemplary embodiment, by moving a pattern of dots serving as a marker pattern representing the skeleton of a walker in the form of a biological motion, display control method, a display control apparatus, and a display apparatus make the driver of a vehicle believe that the object is a pedestrian without driver's gaze shift to the pedestrian present in the peripheral vision.

Figure 1:
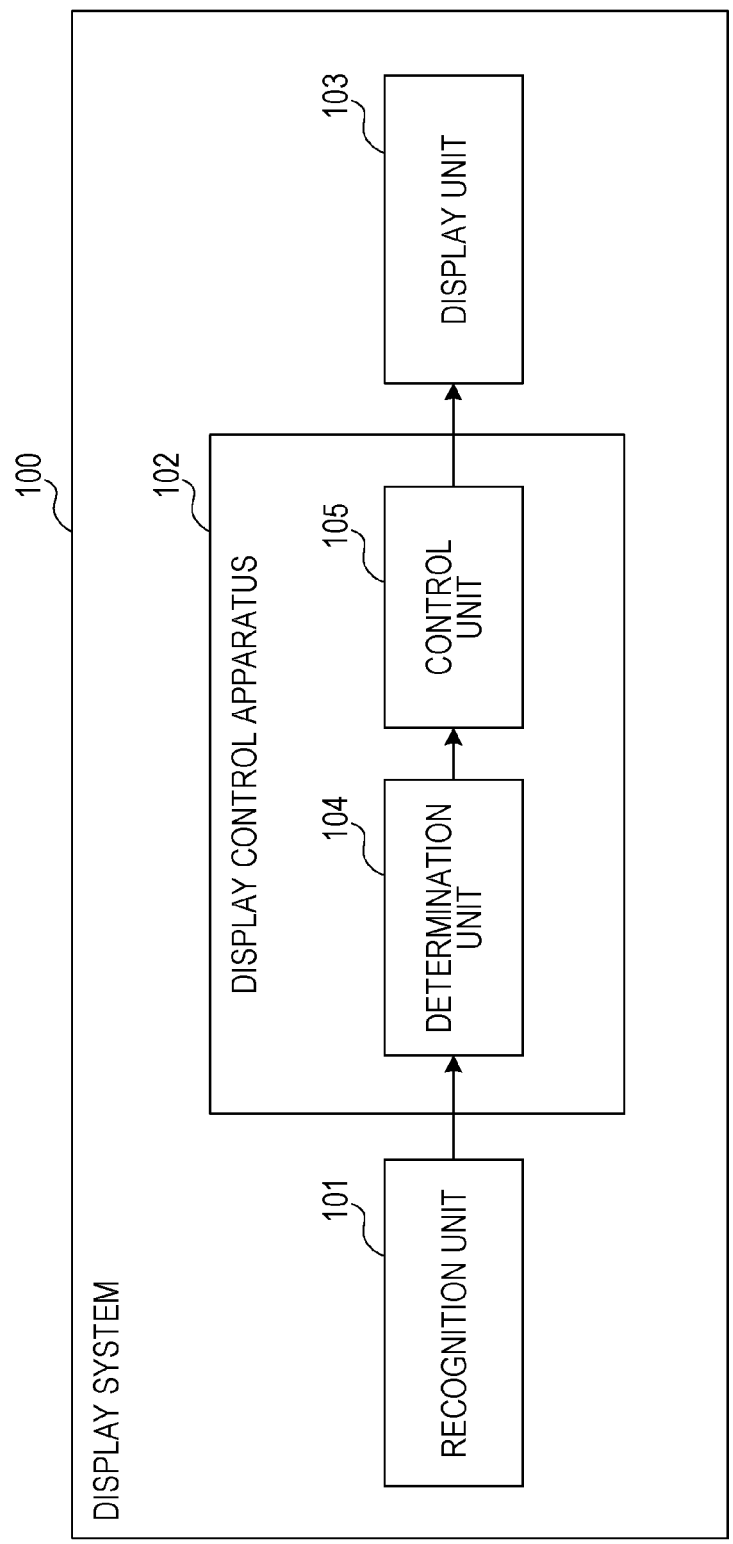
FIG. 1 is a block diagram illustrating the configuration of a display system according to a first exemplary embodiment of the present disclosure.

An example of the configuration of a display system 100 according to the present exemplary embodiment is described below with reference to FIG. 1. FIG. 1 is a block diagram illustrating the configuration of a display system 100 according to the present exemplary embodiment.

For example, the display system 100 is used in a movable body, such as a vehicle. That is, the display system 100 may be an in-vehicle system or a system brought in from outside the vehicle. Note that according to the present exemplary embodiment, the display system 100 is applied to a vehicle. However, the movable body is not limited to a vehicle. For example, the movable body may be a vessel or an airplane. In addition, while the present exemplary embodiment is described with reference to an occupant of a vehicle and, in particular, a driver of the vehicle as a user, the user is not limited thereto. Alternatively, the display system 100 may be applied to a wearable computer (e.g., an HMD described below) that can be attached to the body of the user.

As illustrated in FIG. 1, the display system 100 includes a recognition unit 101, a display control apparatus 102, and a display unit 103.

The recognition unit 101 obtains an image of the front direction, which represents the view of the driver of the vehicle to the front. Thereafter, the recognition unit 101 extracts a feature included in the image of the front direction and recognizes a predetermined object on the basis of the extracted feature. For example, the recognition unit 101 is a sensing camera mounted inside or outside of the vehicle. Examples of the object include, for example, traffic lanes on the road, a signage, road surface markings, curbstones, a guardrail, a traffic signal, a telephone pole, a vehicle, a person, and a building. Note that since the technology to recognize an object is well-known, detailed description of the recognition technology is not repeated here.

The display control apparatus 102 controls image data to be displayed on the display unit 103 on the basis of recognition result information representing the result of recognition obtained by the recognition unit 101 (e.g., the feature of the object). The display control apparatus 102 includes a determination unit 104 and a control unit 105, which are described in more detail below.

The display unit 103 generates image data and displays the generated image data on a display (not illustrated). The display unit 103 has a projector function and directly displays the image data on a display (an example of a display medium). Note that instead of projecting the image data, the display unit 103 may display the image data on a display or may display the image data using a hologram. If the display unit 103 uses a hologram, a light guide plate that leads light using internal total reflection of a parallel ray group that satisfies the internal total reflection conditions of the internal total reflection may be used. By projecting part of a parallel ray group that is led using internal total reflection of the light guide plate, the occupant can view a virtual image. Note that unlike a projector method, image data is not directly displayed in the method using a light guide plate. However, for convenience of description, the word "display" is used, as in the projector method.

Examples of the display include a liquid crystal display (LCD), a head-up display (HUD), a head-mounted display or a helmet-mounted display (HMD), smart glasses, a navigation display, a meter display, and other dedicated display. Note that the HUD may be, for example, the windshield of a vehicle or a glass plate or a plastic plate that is additionally provided. The windshield may be the front window, the side window, or the rear window of the vehicle.

Note that by integrating the display unit 103 into the display control apparatus 102, a display apparatus may be configured.

Note that the above-described image data may be generated by the display control apparatus 102 or another component (not illustrated) instead of the display unit 103.

The image data generated in the display system 100 includes presentation information (a first image and a second image described below) to be presented to the driver of the vehicle. The presentation information is displayed on a display as part of the image data. The displayed presentation information is viewed by the driver in the form of a virtual image. The principal relating to the driver viewing the presentation information on a display as a virtual image is well-known. Accordingly, description of the principal is not repeated here.

Note that instead of displaying the presentation information on a display as part of the image data, the presentation information may be displayed on a display such that the presentation information is superimposed on the view of the driver. In such a case, the display control apparatus 102 may control only the presentation information, and the display unit 103 may display only the presentation information. An example in which the presentation information is displayed on a display such that the presentation information is superimposed on the view of the driver is described below.

The configuration of the display control apparatus 102 according to the present exemplary embodiment is described next. As illustrated in FIG. 1, the display control apparatus 102 includes the determination unit 104 and the control unit 105.

The determination unit 104 determines whether an object recognized by the recognition unit 101 (hereinafter referred to as a "recognized object") is a predetermined object (e.g., a pedestrian) on the basis of the result of recognition received from the recognition unit 101. That is, the determination unit 104 determines the type of recognized object.

If the determination unit 104 determines that the recognized object is a predetermined object, the control unit 105 controls the display unit 103 so that the display unit 103 generates a first image on the basis of the result of recognition of an object included in the image of the front direction captured at a first timing. In addition, the control unit 105 controls the display unit 103 so that the display unit 103 generates a second image on the basis of the result of recognition of an object included in the image of the front direction captured at a second timing that is later than the first timing.

The first image is formed by a pattern of dots representing the skeleton of the predetermined object (e.g., body parts, such as the human face, shoulder, elbow, wrist, knee, and ankle). In addition, the second image is formed by eleven dots corresponding to the eleven dots that form the first image. The position of at least one of the dots that form the first image differs from that of the dots that form the second image. Note that since the distance between a predetermined point and another predetermined point (hereinafter referred to as a point-to-point distance) corresponds to the distance between a body part and another body part in the dots that form the first image and in the dots that form the second image, the difference between the positions of the dots that form the first image and the positions of the dots that form the second image does not exceed beyond a predetermined restriction between the body parts. The point-to-point distance is no less than a predetermined distance (the approximate distance between the actual body parts). Note that the above-mentioned dots need not accurately indicate the positions of the body parts of the object. It is only required that each of the dots indicates the approximate position of one of the body parts.

Figure 2:
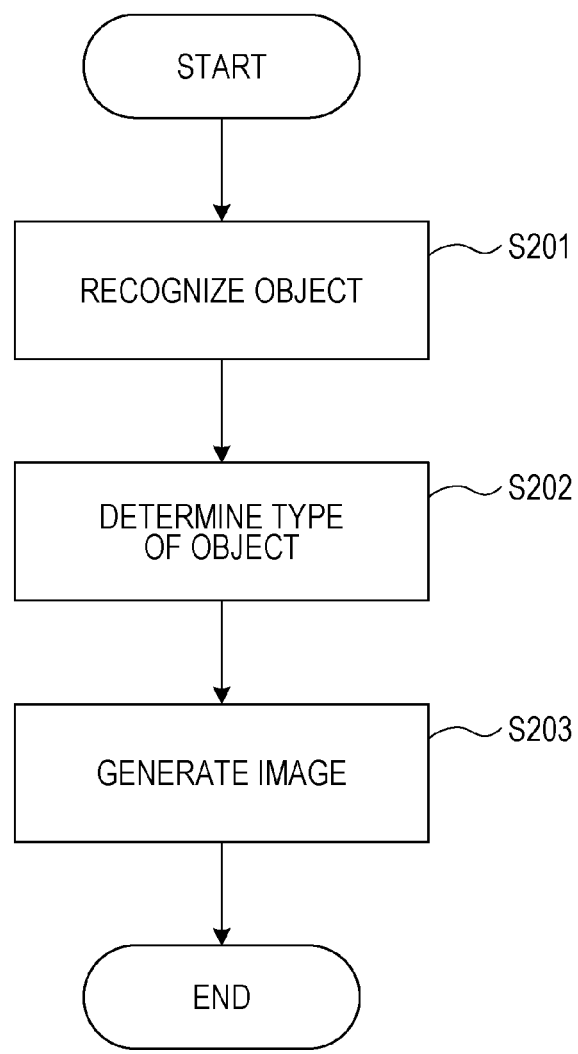
FIG. 2 is a flowchart illustrating an example of the operation performed by the display system according to the first exemplary embodiment of the present disclosure.

An example of the operation performed by the display system 100 according to the present exemplary embodiment is described next with reference to FIG. 2. FIG. 2 is a flowchart illustrating an example of the operation performed by the display system 100 according to the present exemplary embodiment.

The operation performed by the display system 100 is described with reference to the flowchart illustrated in FIG. 2.

In step S201, the recognition unit 101 obtains the image of the front direction and extracts a feature included in the image of the front direction. Thereafter, the recognition unit 101 recognizes the predetermined object on the basis of the extracted feature.

In step S202, the determination unit 104 of the display control apparatus 102 determines the type of object recognized by the recognition unit 101 on the basis of the result of recognition received from the recognition unit 101. For example, the determination unit 104 determines whether the recognized object is a pedestrian.

If the determination unit 104 determines that the recognized object is a pedestrian, the control unit 105 of the display control apparatus 102 performs the processing in step S203 described below. That is, the control unit 105 controls the display unit 103 so that the display unit 103 generates the first image or the second image using the feature of the pedestrian extracted by the recognition unit 101 and displays the generated image on the display. Through such control, the display unit 103 generates the first image or the second image and displays the generated image on the display. As a result, the driver can view the first image or the second image. Note that at that time, the first image or the second image is displayed on the display in a superimposed manner over, for example, the image of the front direction acquired by the recognition unit 101 (refer to FIGS. 3A to 3D described below). For example, it is desirable that the acquisition of the image of the front direction by the recognition unit 101 and the generation of the image and the display of the generated image by the display unit 103 be sequentially performed in real time, and the image be displayed in a superimposed manner over the image of the front direction used for the image generation or an image temporally previous or subsequent to the image of the front direction.

An example of the first image and the second image in the display system 100 according to the present exemplary embodiment are described next with reference to FIGS. 3A to 3D. FIGS. 3A to 3D illustrate an example of the view of the driver to the front (the image of the front direction) and an example of the first image or the second image presented to the driver.

As illustrated in FIG. 3A, a view 301 represents a scene that the driver of the vehicle recognizes at a time t (an example of a first timing). The view 301 includes, for example, a road, a crosswalk, a traffic signal, and a pedestrian standing by the side of a street. If it is determined that a recognized object 302 in the view 301 is a pedestrian, a first image 303 is displayed over the view 301 in a superimposed manner, as illustrated in FIG. 3B. The first image 303 is formed by dots representing the skeleton of the recognized object 302 (e.g., the pedestrian standing by the side of a street) at the time t.

As illustrated in FIG. 3C, a view 304 represents a scene that the driver of the vehicle recognizes in front of the vehicle at a time t' (t'>t, and the time t' is an example of a second timing). Like the view 301, the view 304 includes, for example, a road, a crosswalk, a traffic signal, and a pedestrian standing by the side of a street. If it is determined that a recognized object 305 in the view 304 is a pedestrian, a second image 306 is displayed over the view 304 in a superimposed manner, as illustrated in FIG. 3D. The second image 306 is formed by dots representing the skeleton of the recognized object 305 (e.g., the pedestrian who just started to walk onto the crosswalk) at the time t'.

As described above, the present exemplary embodiment is characterized in that dots representing the skeleton are moved in the form of a biological motion. In this manner, according to the present exemplary embodiment, the driver can identify the type of object without turning their eyes to the object located in their peripheral vision. For example, the driver can intuitively recognize a human specific motion using a change in positions of the dots in the first image to the second image. Accordingly, even when a variety of objects are present in the view of a driver, the driver can instantly recognize a pedestrian.

Figure 4:
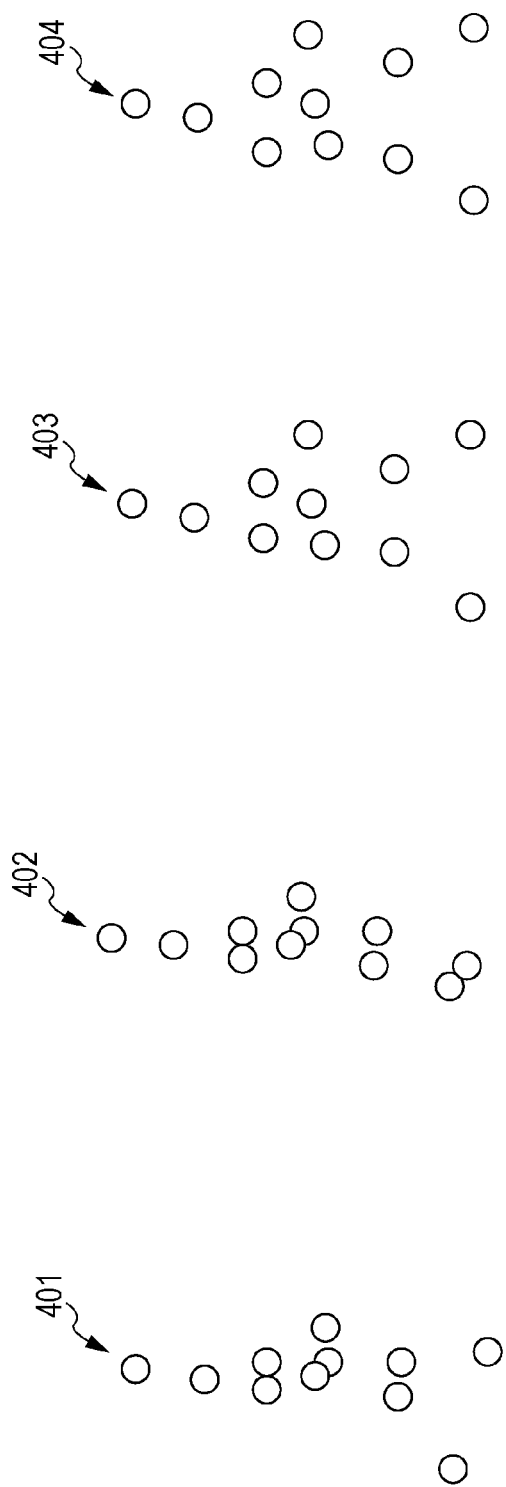
FIG. 4 illustrates an example of a pattern of dots according to the first exemplary embodiment of the present disclosure.

Note that the display unit 103 may determine the arrangement of the dots according to the present exemplary embodiment on the basis of the feature of the recognized object or templates 401 to 404 of dots provided in advance (refer to FIG. 4). In addition, while the present exemplary embodiment has been described with reference to the first image and the second image that are displayed, it is desirable that at least three images be displayed in the form of a continuous or repeated animation of the dots of the biological motion, as illustrated in FIG. 4. For example, it is reported that a period of time from the time a person views a biological motion to the time the brain wave of the person is activated is about 200 milliseconds. Accordingly, if seven frames of a video of 30 frames per second (33 milliseconds for displaying a frame) are displayed, about 200 milliseconds elapse and, thus, the display of the video is completed at a point in time when the activity of the brain waves due to a first image is about to start. Therefore, the display does not bother the person. Alternatively, by using a unit for determining whether the driver recognizes an object, the images may be displayed during a period of time in which the driver does not recognize an object.

Still alternatively, if the driver does not recognize an object or if the driver does not view the displayed image, the seven images may be sequentially displayed in each frame for a period of time of 33 milliseconds after a predetermined time period elapses after from a time the immediately previous display is completed.

Note that according to the present exemplary embodiment, the generated images are displayed as frame images having a display cycle of 30 frames per second (a frame frequency of 30 Hz). However, the display technique is not limited thereto. For example, the generated images may be displayed as frame images of a video of 15 frames per second. Alternatively, the images may be displayed as a series of the same two frame images in a video of 30 frames per second.

While the present exemplary embodiment has been described with reference to an object that moves in the form of biological motion represented as a plurality of points, any shape of a marker that is recognized as a pedestrian can be employed. For example, a marker having a shape of a precise circle, an ellipse, or a rectangle may be employed.

While the present disclosure has been described with reference to the exemplary embodiment, the present disclosure is not limited to the above-described exemplary embodiment. The various modifications and changes to the embodiment may be made. Such modifications and changes are described below.

While the present exemplary embodiment has been described with reference to an example in which the size of a skeleton represented by the dots is not changed between the first image 303 and the second image 306, the size is not limited thereto. For example, the size of a skeleton represented by the dots may be changed between the first image and the second image in accordance with the size of the object that is perceived by the eyes of the driver. For example, when a pedestrian moves closer to the vehicle or the vehicle moves closer to a pedestrian, the skeleton may be generated and displayed so that the size thereof in the second image is larger than the size in the first image. Even in such a case, since a distance between the dots corresponds to a distance between the body parts, the distance does not exceed a predetermined distance (an approximate distance between actual body parts). For example, it is desirable that the skeleton be displayed so that the driver can recognize that the dots correspond to the object.

In addition, after a person views a biological motion having a high display speed (i.e., the period of time between the first timing and the second timing is short), the response speed of the person for a task independent from a task of the biological motion is increased. In contrast, after a person views a biological motion having a low display speed (i.e., the period of time between the first timing and the second timing is long), the response speed of the person for a task independent from a task of the biological motion is decreased (refer to, for example, Watanabe, "Who Owns My Mind?", Sony Semiconductor & Device News CX-PAL, Vol. 86, 2010). Accordingly, in the above-described exemplary embodiment, a period of time between the first timing (the time t) and the second timing (the time t') may be changed in accordance with the distance between the object and the vehicle, the moving speed of the object, or the approaching speed of the object (the speed of the object relative to the vehicle). A particular example is described below.

For example, if the distance between the object and the vehicle is less than a predetermined threshold value or if the moving speed of the object is higher than a predetermined threshold value, the control unit 105 reduces the time interval between the first timing and the second timing to less than the preset time interval. In this manner, a display interval between the first image and the second image is decreased and, thus, the presentation speed of the biological motion is increased. That is, a change from the first image to the second image immediately occurs. As a result, when a high degree of urgency is conveyed to the driver and an appropriate evasive action by the driver is required, the response speed of the action to be taken by the driver, such as applying brakes, can be increased. In contrast, if the distance between the object and the vehicle is greater than a predetermined threshold value, if the moving speed of the object is lower than a predetermined threshold value, or if the approaching speed of the object to the vehicle is lower than a predetermined threshold value, the control unit 105 increases the time interval between the first timing and the second timing to greater than the preset time interval. In this manner, the display interval between the first image and the second image is increased and, thus, the presentation speed of the biological motion is decreased. That is, a change from the first image to the second image does not immediately occur. As a result, when the low degree of urgency is conveyed to the driver and a quick evasive action by the driver is not required, the response speed of the action to be taken by the driver can be decreased to lower than that in urgent cases.

Figure 5:
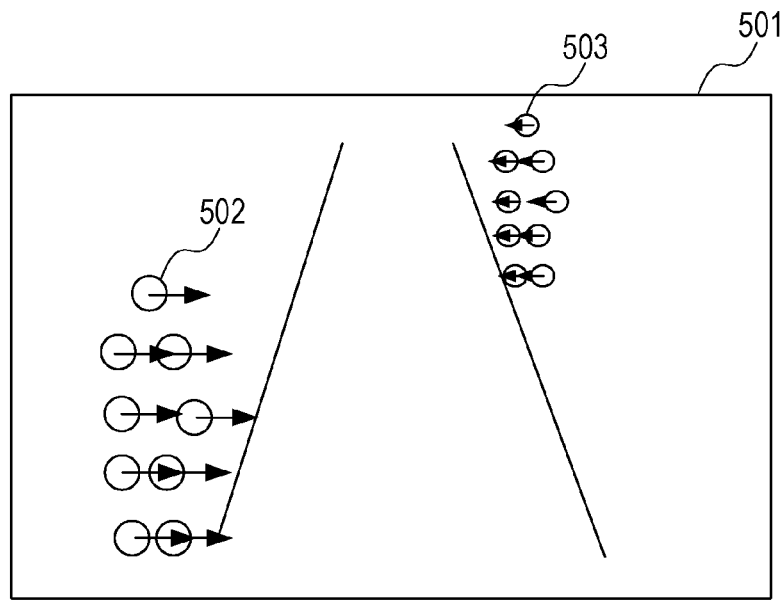
FIG. 5 illustrates an example of an image presented to a driver according to the first exemplary embodiment of the present disclosure.

Note that in the above description, instead of representing the degree of urgency using a change in the moving speed of the dots, the degree of urgency may be represented by a change in displacement of the dots. This particular example is described below with reference to FIG. 5. In FIG. 5, a first image 502 and a first image 503 are displayed over a view 501 in a superimposed manner. The first image 502 is formed by dots representing the skeleton of a pedestrian located in the vicinity of the vehicle. The first image 503 is formed by dots representing the skeleton of a pedestrian located far from the vehicle. In FIG. 5, arrows indicate the moving directions of the two pedestrians. The length of each of the arrows indicates the displacement. In this case, in a second image (not illustrated) corresponding to the first image 502, the dots that form the first image 502 are displayed after being moved in the directions of the arrows (the right direction) in FIG. 5. In addition, in a second image (not illustrated) corresponding to the first image 503, the dots that form the first image 503 are displayed after being moved in the directions of the arrows (the left direction) in FIG. 5. Since as described above, the length of each of the arrows indicates the displacement, the displacement of the dots that form the first image 502 is greater than the displacement of the dots that form the first image 503. Accordingly, the driver recognizes that the second image corresponding to the first image 502 moves more than the second image corresponding to the first image 503 and, thus, recognizes that the degree of urgency for the pedestrian located in the vicinity of the vehicle is higher than that for the other pedestrian. Note that the movement of the dots may be displayed in an exaggerated manner if the driver can recognize that a dot indicating a joint at a given time corresponds to a dot indicating the joint at the next time. Alternatively, in case of the highest degree of urgency, a display that needs to be recognized by the driver and the other displays may be combined and displayed.

In addition, in the above-described exemplary embodiment, the control unit 105 may perform control so that the first image or the second image is generated and displayed in only the peripheral vision. Since the human peripheral vision is sensitive to motion, the driver easily pays attention to the first image or the second image. Note that the control to display the first image or the second image in only the peripheral vision may be performed only when the vehicle moves along a straight path. For example, by using a camera, the determination unit 104 of the display system 100 can determine whether the vehicle moves along a straight path.

In addition, in the above-described exemplary embodiment, the control unit 105 may perform control so as not to generate and display the first image or the second image if the distance between a crosswalk and the vehicle is within a predetermined distance and the vehicle stops.

Figure 6:
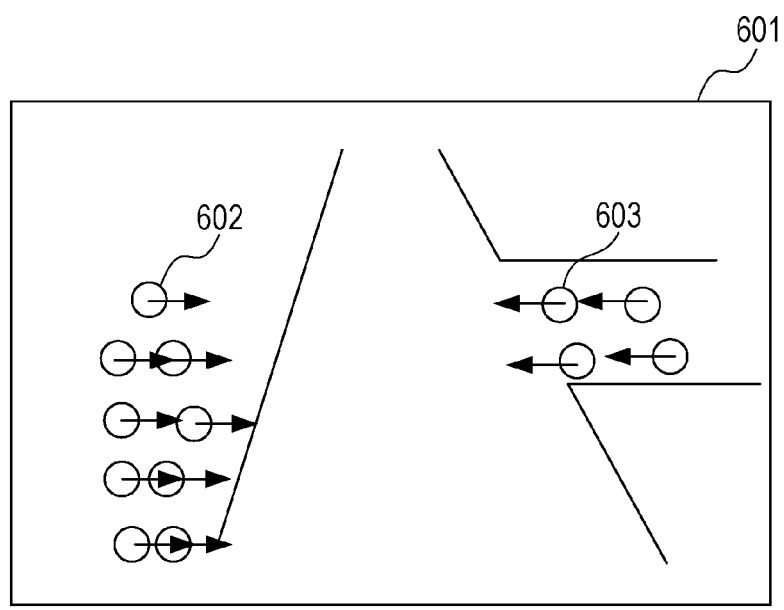
FIG. 6 illustrates an example of an image presented to a driver according to the first exemplary embodiment of the present disclosure.

Furthermore, while the above exemplary embodiment has been described with reference to an example in which the recognized object is a pedestrian and the first image or the second image formed by dots representing the skeleton of the pedestrian is displayed, the recognized object may be a moving object, such as an animal, a vehicle, a motorcycle, or a bicycle. For example, in the case of the moving object being a rigid body, such as a vehicle, although an arrangement of all the dots that form the first image is the same as that of the second image, the positions of the entire dots (the positions in the images) differ from each other. An example of the displayed image in the case in which the recognized object is a vehicle is illustrated in FIG. 6. As illustrated in FIG. 6, the dots representing the skeleton of the vehicle (e.g., four tires) are displayed on a view 501 as the first image 502 in a superimposed manner. Arrows in FIG. 6 indicate the moving direction of the vehicle. Accordingly, in a second image (not illustrated) corresponding to the first image 502, the dots that form the first image 502 are displayed after being moved in the direction of the arrows in FIG. 6 (the left direction). At that time, since the skeleton of the vehicle does not vary during the movement, the distance between the dots in the first image 502 is the same as that in the second image corresponding to the first image 502. The arrangement of all the dots that form the first image is the same as the arrangement of all the dots that form the second image. In contrast, the positions of the entire dots (the positions of the dots in the images) differ from each other. While the above description has been made with reference to the vehicle, the pedestrian may be displayed in the same manner as the vehicle if the postures of the pedestrian are the same at the first timing and the second timing (any body part of the pedestrian does not move). For a person who is not actually moving, the dots that form the first image and the dots that form the second image may be displayed so that although the arrangements are the same, the positions of the entire dots differ from each other. In this manner, in an environment in which a pedestrian, an animal, and a vehicle are present, the driver can recognize moving objects approaching toward the vehicle of the driver in the same display format and, at the same time, the driver can instantly differentiate the pedestrian and the animal, which are vulnerable road users and which are creatures having behavior that is difficult for the driver to anticipate, from the vehicle, which probably moves in accordance with traffic regulations.

Second Exemplary Embodiment

A second exemplary embodiment of the present disclosure is described below with reference to the accompanying drawings.

A difference between the distance between the driver and an object located outside the vehicle and the distance between the driver and the display causes a problem of a double image that is the phenomenon a human vision recognized two objects of the same object because of physiologic diplopia. The distance of the right and left eyes of a person is about 6 to 6.5 cm. Accordingly, if the person stares at an object, images formed in the right and left retinas have a parallax, that is, the images cause binocular disparity. Thus, an object which the person stares at can be recognized as a single image. In contrast, an object located far from the object that the person stares at is recognized as two images, that is, a double image.

If a double image appears in the driver's vision, the driver has a difficulty in matching an object to a marker. As a result, a sufficient effect of displaying the marker cannot be obtained.

According to the second exemplary embodiment, to solve such a problem of the double image, lines are employed as the shapes of markers representing the skeleton of a pedestrian. Such an example is described below.

Figure 8:
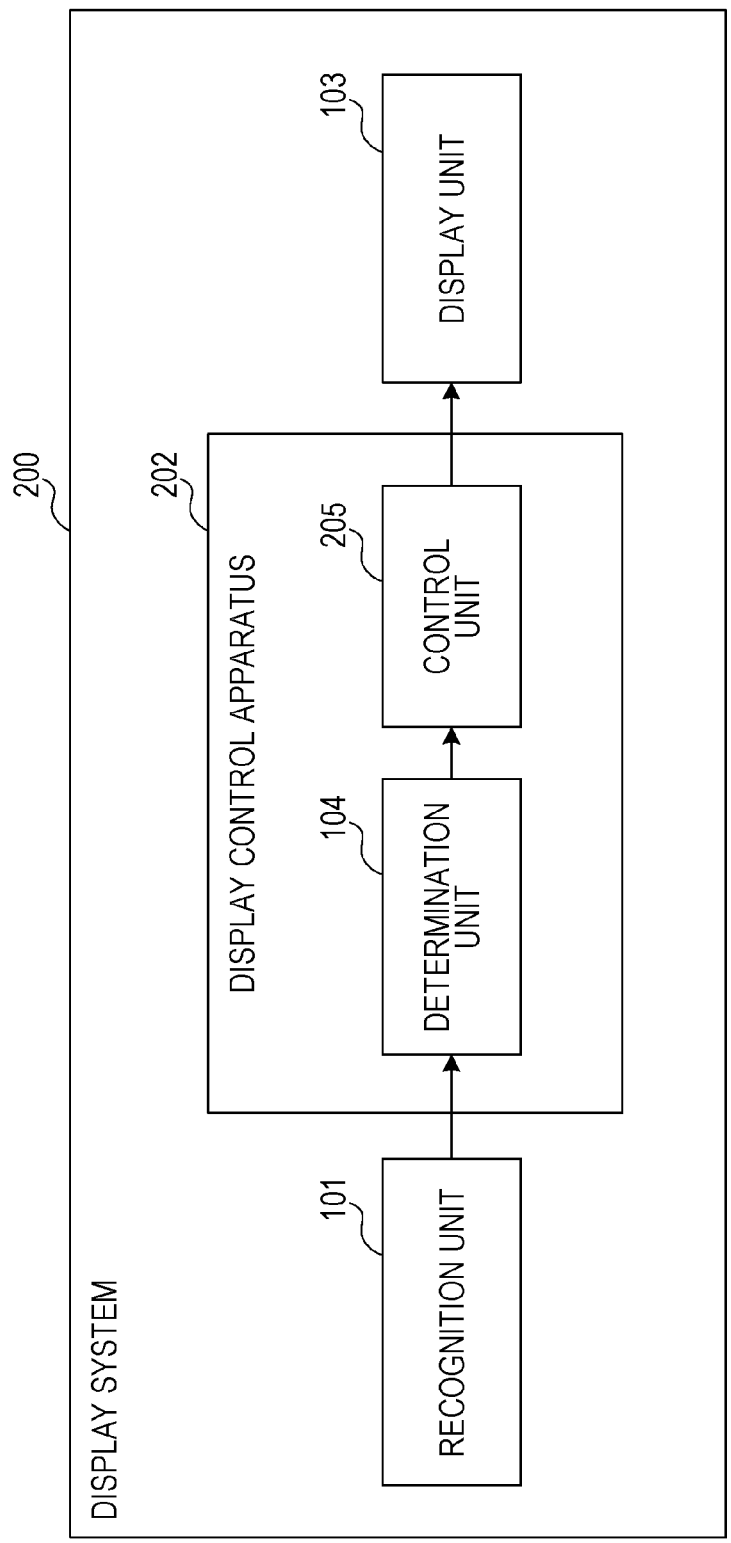
FIG. 8 is a block diagram illustrating an example of the configuration of a display system according to a second exemplary embodiment of the present disclosure.

An example of the configuration of a display system 200 according to the present exemplary embodiment is described with reference to FIG. 8. FIG. 8 is a block diagram illustrating an example of the configuration of a display system 200 according to the present exemplary embodiment.

Note that, in the present exemplary embodiment, elements similar to those of the first exemplary embodiment are identified with the same reference numeral, and detailed description of the elements are not repeated.

As illustrated in FIG. 8, the display system 200 includes a recognition unit 101, a display control apparatus 202, and a display unit 103. The display control apparatus 202 includes a determination unit 104 and a control unit 205.

The control unit 205 generates a first image and a second image that differ from those generated by the control unit 105. The control unit 205 generates the first image and the second image so that lines are rendered as markers that represent the skeleton of a predetermined object.

Figure 9:
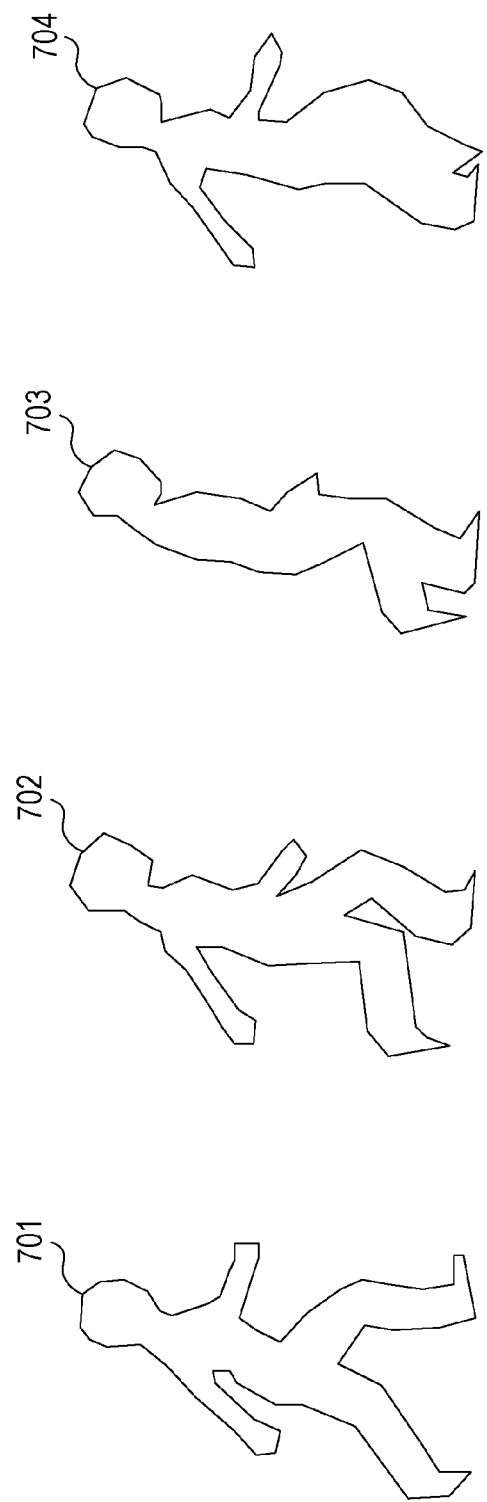
FIG. 9 illustrates an example of a person according to the second exemplary embodiment of the present disclosure.
Figure 10:
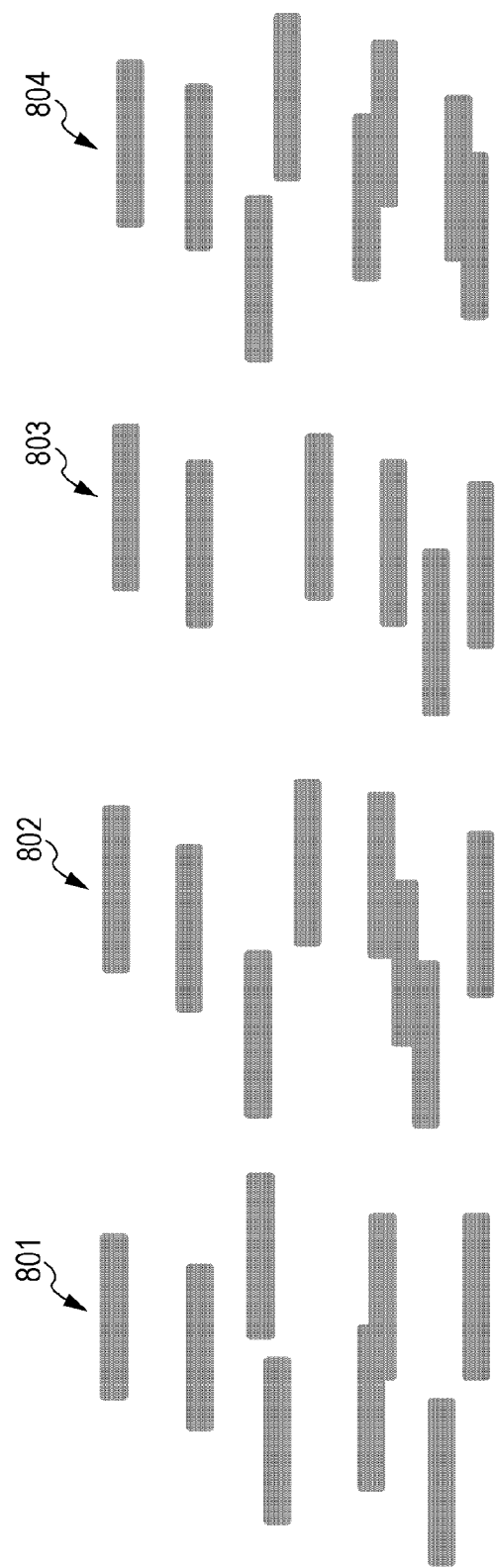
FIG. 10 illustrates an example of a pattern of lines according to the second exemplary embodiment of the present disclosure.
Figure 11:
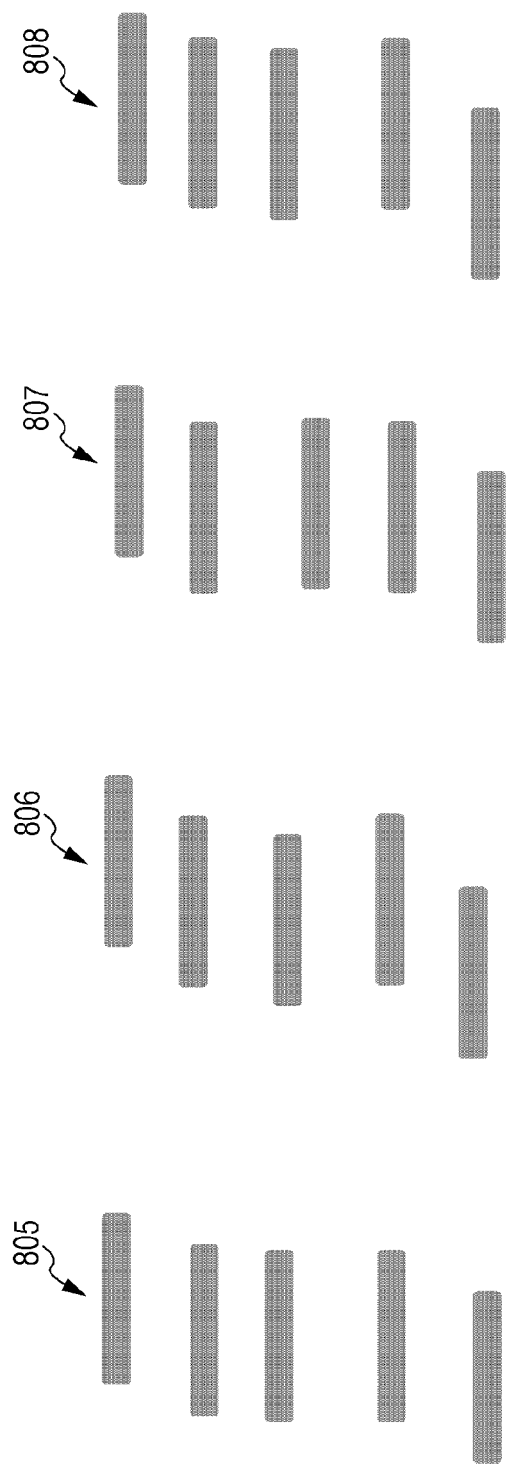
FIG. 11 illustrates an example of a pattern of lines according to the second exemplary embodiment of the present disclosure.

Examples of the first image and the second image generated by the control unit 205 are described with reference to FIGS. 9, 10, and 11. FIG. 9 illustrates a person who is walking. Outlines 701 to 704 represent the walking person at different points in time. Line groups 801 to 804 in FIG. 10 correspond to the outlines 701 to 704 in FIG. 9, respectively. In each of the line groups 801 to 804, lines extending in the horizontal direction and serving as markers are rendered at the positions of the head, the neck, the left hand, the right hand, the left knee, the right knee, the left ankle, and the right ankle, which represent the skeleton of the person. In addition, line groups 805 to 808 in FIG. 11 correspond to the outlines 701 to 704 in FIG. 9, respectively. In each of the line groups 805 to 808, lines extending in the horizontal direction and serving as markers are rendered at the positions of the head, the neck, the waist, the middle point between the right knee and the left knee, and the middle point between the right ankle and the left ankle, which represent the skeleton of the person.

FIG. 12 illustrates an example of display from the viewpoint of the driver when a double image occurs. The difference between the distance between the driver and the object located outside the vehicle and the distance between the driver and the display causes the driver to see a marker as two markers. An image 901 in FIG. 12 represents an image from the viewpoint of the driver when the driver pays attention to the marker. At that time, the driver sees two of the person. In addition, an image 902 in FIG. 12 represents an image from the viewpoint of the driver when the driver pays attention to the person. At that time, the driver sees two of the marker. The display control apparatus 202 renders the marker line in the horizontal direction. Accordingly, even when the marker separates into a right marker and a left marker due to a double image phenomenon, the driver can see the right marker and the left marker as if the two makers were connected in the middle between the two markers, as indicated by the image 902. As a result, the driver can easily associate the person with the marker. Thus, even when a double image occurs, the driver can recognize the biological motion using the displayed markers in the first image and the second image.

Note that if a plurality of objects are present, display of each of markers corresponding to the plurality of objects is independently controlled. For example, when two objects to be marked are present and if the distance between the objects is less than or equal to a predetermined threshold value, only a marker for the object that is the closest to the vehicle may be displayed. However, if the distance between the objects is greater than the predetermined threshold value, the markers for the objects may be displayed.

In addition, the length of the marker in the horizontal direction may be determined on the basis of the distance between the driver and the object. The binocular disparity caused by a double image increases with increasing distance between the driver and the object. Accordingly, for example, the length of the marker line may be increased with increasing distance between the driver and the object.

In addition, since the right and the left portions of a marker line are viewed differently due to a double image phenomenon, at least one of the contrasting density and transmittance of the marker may be changed. For example, the middle portion of the marker may be displayed with a relatively dark color, and the color may be gradually lightened or brightened from the middle portion toward an end of the marker.

In addition, the length of each of the marker lines representing the skeleton of a person may be changed position by position. The case in which the length of the line is constant and the case in which the length of the line is changed position by position are described below with reference to FIG. 13. FIG. 13 illustrates a person 903 and markers 904 and 905 corresponding to the person 903 as examples. The marker 904 is an example when the length of the line is constant, and the marker 905 is an example when the length of the line is changed position by position. Furthermore, a view 906 is an example when the marker 904 is displayed on a display and the driver pays attention to a person. A view 907 is an example when the marker 905 is displayed on a display and the driver pays attention to a person. Since the combination of the lengths of the marker lines in the view 907 is more similar to the shape of an actual person than in the view 906, the driver can more easily identify the type of object.

The color of each of the marker lines may be changed in accordance with the actual colors of an object. For example, the marker representing the face of a person may have a color that is the same as the color of the hair of head or the color of a hat. The markers representing the knee and the ankle of a person may have colors that are the same as the colors of the pants and the shoes of the person, respectively. Since the colors of the markers matches the actual colors of the object, the driver can more easily identify the type of object.

While the present exemplary embodiment has been described with reference to a straight line shape of a marker moved with a biological motion, the shape of the marker may be a rectangle or a rectangle with round ends. In addition, while the present exemplary embodiment has been described with reference to the marker line rendered in the horizontal direction, the rendering may be made in the horizontal direction so that even when the marker separates into the right and left portions due to a double image phenomenon, the right and left portions seem to be connected to each other in the middle of the marker line.

Furthermore, the above-described functions of the units of the display system 100 and the display control apparatus 102 can be realized by a computer program.

Figure 7:
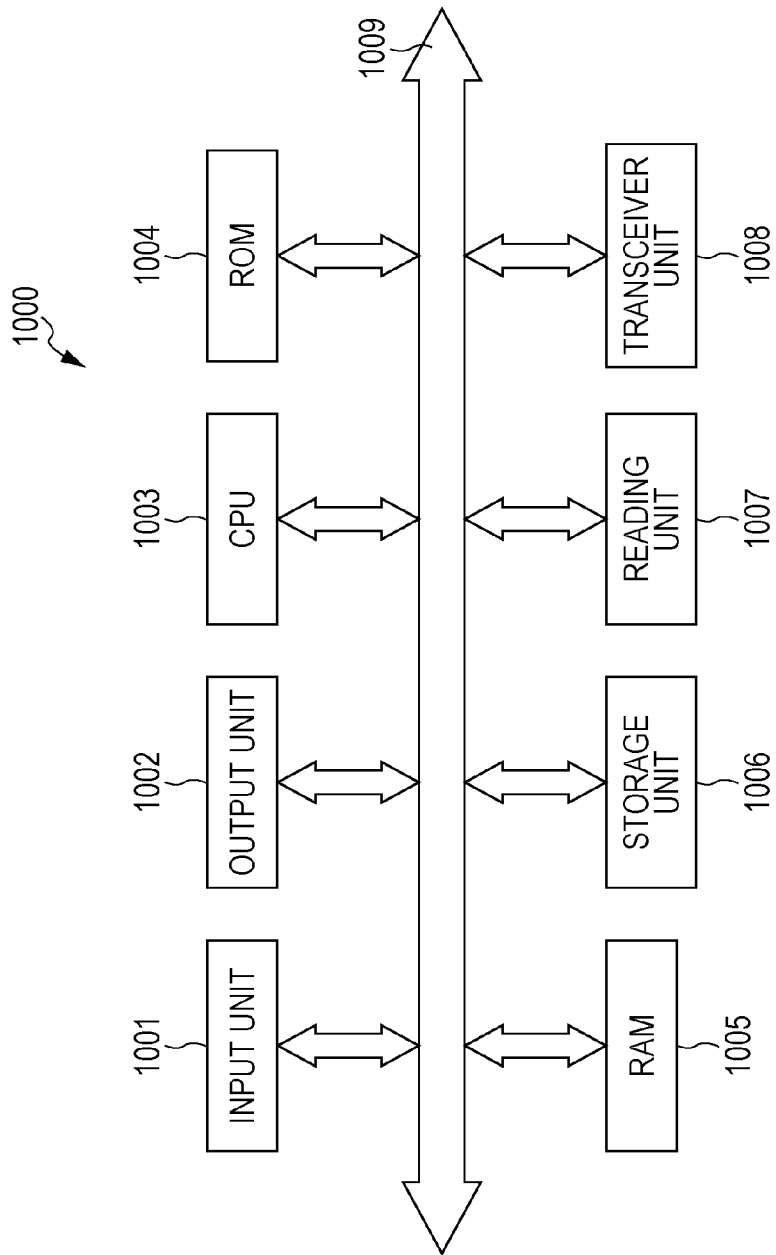
FIG. 7 is a block diagram illustrating an example of the hardware configuration of a display system and a display control apparatus according to the first exemplary embodiment of the present disclosure.

FIG. 7 illustrates the hardware configuration of a computer that provides the above-described functions of the units using a program. As illustrated in FIG. 7, a computer 1000 includes an input unit 1001, such as an input button or a touch pad, an output unit 1002, such as a display or a speaker, a central processing unit (CPU) 1003, a read only memory (ROM) 1004, a random access memory (RAM) 1005, a storage unit 1006, such as a hard disk drive or a solid state drive (SSD), a reading unit 1007 that reads information from storage media, such as a digital versatile disk read only memory (DVD-ROM) and a universal serial bus (USB), and a transceiver unit 1008 that communicates data via a network. These units are connected with one another via a bus 1009.

The reading unit 1007 reads a program for realizing the functions of the above-described units from a recording medium that stores the program. Thereafter, the reading unit 1007 stores the program in the storage unit 1006. Alternatively, the transceiver unit 1008 communicates with a server apparatus connected to the network and downloads a program for realizing the functions of the above-described units from the server apparatus and stores the program in the storage unit 1006.

Subsequently, the CPU 1003 copies the program stored in the storage unit 1006 into the RAM 1005. Thereafter, the CPU 1003 sequentially reads, from the RAM 1005, instructions contained in the program and executes the instruction. In this manner, the functions of the above-described units are realized. In addition, when the program is executed, the information obtained in the processes described in the above-described exemplary embodiments is stored in the RAM 1005 or the storage unit 1006 and is used as necessary.

The present disclosure is applicable to a display control apparatus, a display control method, and a display control program that present information to get driver's attention.

What is claimed is:

1. A method of controlling a display control apparatus in a display system including a camera and a display, the camera acquiring images of a front direction of a movable body and recognizing an object contained in the images in a peripheral vision of the front direction, the display displaying the images based on a result of recognition of the object by the camera, the method comprising:
   determining, by a processor, whether the object is a predetermined object; and
   controlling the display to display, at a first timing, a first image based on the result of the recognition of the object and to display, at a second timing later than the first timing, a second image based on the result of the recognition of the object if the processor determines the object is the predetermined object,
   wherein the first image is formed by a first pattern of markers representing a skeleton within the object, and the second image is formed by a second pattern of markers corresponding to the first pattern of markers in the first image, markers of the first and second patterns of markers being in a form of dots, horizontal straight lines, rectangles, or rectangles with round ends, and
   wherein a position of at least one of the markers in the first image differs from a position of a corresponding marker in the second image.

2. The method according to claim 1, further comprising:
   controlling a period of time between the first timing and the second timing to be less than a preset time interval when a distance between the object and the movable body is less than a predetermined threshold value, if a moving speed of the object is higher than a predetermined threshold value, or if an approaching speed of the object to the movable body is higher than a predetermined threshold value; and
   controlling the period of time between the first timing and the second timing to be greater than the preset time interval when the distance between the object and the movable body is greater than the predetermined threshold value, if the moving speed of the object is lower than the predetermined threshold value, or if the approaching speed of the object to the movable body is lower than the predetermined threshold value.

3. The method according to claim 1,
   wherein the markers of the first and second patterns of markers are in the form of the horizontal straight lines, and
   a length of a line serving as a marker is determined in accordance with a distance between the object and the movable body.

4. The method according to claim 1,
   wherein the form of dots includes dots indicating a plurality of joints.

5. The method according to claim 1,
   wherein the first image includes the first pattern of markers being superimposed on the object in a first one of the images acquired by the camera at a first time.

6. The method according to claim 5,
   wherein the predetermined object is a pedestrian, and
   wherein the first pattern of markers of the first image, which are superimposed on the object in the first one of the images acquired by the camera at the first time, do not accurately indicate positions of body parts of the object.

7. The method according to claim 5,
   wherein the second image includes the second pattern of markers being superimposed on the object in a second one of the images acquired by the camera at a second time.

8. The method according to claim 7,
   wherein a period of time between when the first one of the images is acquired by the camera at the first time and when the second one of the images is acquired by the camera at the second time is changed to define the first timing and the second timing at which the first image and the second image are displayed.

9. The method according to claim 8,
   wherein the period of time is changed in accordance with a distance between the object and the movable body.

10. The method according to claim 9,
    wherein the period of time between when the first one of the images is acquired by the camera at the first time and when the second one of the images is acquired by the camera at the second time is reduced to define the first timing and the second timing at which the first image and the second image are displayed if the distance between the between the object and the movable body is less than a predetermined threshold.

11. The method according to claim 8,
wherein the period of time is changed in accordance with a moving speed of the movable body.

12. The method according to claim 11,
wherein the period of time between when the first one of the images is acquired by the camera at the first time and when the second one of the images is acquired by the camera at the second time is increased to define the first timing and the second timing at which the first image and the second image are displayed if the moving speed of the movable body is lower than a predetermined threshold.

13. The method according to claim 7,
wherein the first image and the second image are displayed as a continuous or repeated animation.

14. The method according to claim 1,
wherein the first image and the second image are displayed on the display in a superimposed manner.

15. The method according to claim 1,
wherein a difference between the position of the at least one of the markers in the first image and the position of the corresponding marker in the second image is exaggerated with respect to a difference in position of the object in the images.

16. A display control apparatus for use in a display system including a camera and a display, the camera acquiring images of a front direction of a movable body and recognizing an object contained in the images in a peripheral vision of the front direction, the display displaying the images based on a result of recognition of the object by the camera, the display control apparatus comprising:
a processor; and
a memory including instructions that, when executed by the processor, cause the processor to perform operations including:
determining whether the object is a predetermined object; and
controlling the display to display, at a first timing, a first image based on the result of the recognition of the object and to display, at a second timing later than the first timing, a second image based on the result of the recognition of the object if the processor determines the object is the predetermined object,
wherein the first image is formed by a first pattern of markers representing a skeleton within the object, and the second image is formed by a second pattern of markers corresponding to the first pattern of markers in the first image, markers of the first and second patterns of markers being in a form of dots, horizontal straight lines, rectangles or rectangles with round ends, and
wherein a position of at least one of the markers in the first image differs from a position of a corresponding marker in the second image.

17. A display system comprising:
a processor;
a memory including instructions that, when executed by the processor, cause the processor to perform operations including:
acquiring images of a front direction of a movable body; and
determining whether an object contained in the images in a peripheral vision of the front direction and recognized by a camera is a predetermined object; and
a display that displays the images based on a result of recognition of the object,
wherein the operations further including:
controlling the display to display, at a first timing, a first image based on the result of the recognition of the object and to display, at a second timing later than the first timing, a second image based on the result of the recognition of the object if the processor determines the object is the predetermined object,
wherein the first image is formed by a first pattern of markers representing a skeleton within the object, and the second image represents a second pattern of markers corresponding to the first pattern of markers in the first image, markers of the first and second patterns of markers being in a form of dots, horizontal straight lines, rectangles, or rectangles with round ends, and
wherein a position of at least one of the markers in the first image differs from a position of a corresponding marker in the second image.

18. A non-transitory, tangible storage medium including an executable program that, when executed by a computer, causes the computer to perform operations comprising:
acquiring images of a front direction of a movable body, the images being acquired by a camera, the camera recognizing an object contained in the images in a peripheral vision of the front direction, the images being displayable based on a result of recognition of the object by the camera;
determining whether the object contained in the images in the peripheral vision of the front direction and recognized by the camera is a predetermined object;
controlling a display to display, at a first timing, a first image based on the result of the recognition of the object and to display, at a second timing later than the first timing, a second image based on the result of the recognition of the object if the processor determines the object is the predetermined object,
wherein the first image is formed by a first pattern of markers representing a skeleton within the object, and the second image represents a second pattern of markers corresponding to the first pattern of markers in the first image, markers of the first and second patterns of markers being in a form of dots, horizontal straight lines, rectangles, or rectangles with round ends, and
wherein a position of at least one of the markers in the first image differs from a position of a corresponding marker in the second image.

* * * * *